United States Patent [19]

Taylor

[11] 4,335,911

[45] Jun. 22, 1982

[54] DOOR HOLDER

[75] Inventor: James L. Taylor, Washington, Ill.

[73] Assignee: Caterpillar Tractor Co., Peoria, Ill.

[21] Appl. No.: 174,388

[22] PCT Filed: Feb. 19, 1980

[86] PCT No.: PCT/US80/00168

§ 371 Date: Feb. 19, 1980

§ 102(e) Date: Feb. 19, 1980

[87] PCT Pub. No.: WO81/02439

PCT Pub. Date: Sep. 3, 1981

[51] Int. Cl.³ .............................................. E05C 17/56
[52] U.S. Cl. .................................. 292/262; 292/251.5
[58] Field of Search .................... 292/251.5, 262, 338, 292/339, DIG. 25, DIG. 28, DIG. 46; 296/28 C

[56] References Cited

U.S. PATENT DOCUMENTS

| 875,114 | 12/1907 | Scheld | 292/277 |
| 1,631,980 | 6/1927 | Piccirilli | 292/DIG. 15 |
| 2,472,397 | 6/1949 | Bennett | 292/251.5 |
| 3,111,340 | 11/1963 | Spencer | 292/DIG. 15 |
| 3,533,652 | 10/1970 | Crane et al. | 292/113 |
| 4,035,016 | 7/1977 | Ricca | 292/113 |

Primary Examiner—Richard E. Moore
Attorney, Agent, or Firm—Wegner, Stellman, McCord, Wood & Dalton

[57] ABSTRACT

A door structure (10) having a blocking element (19) selectively positionable to hold a door (13) in an open disposition relative to an opening (12) in a wall structure (11) to which the door is hingedly mounted. The door holding structure includes a blocking element (19) pivotally mounted at one end to one portion (21) of the wall structure (11) and provided at its distal end (24) with a magnetic element (31). The door (13) carries an electromagnetic device (33) which is selectively energizeable to releasably magnetically hold the plate (31) when desired. Energization of the electromagnetic device coil (40) is controlled by one or more switches (38,39). One illustrative switch is a proximity switch arranged to be closed as an incident of positioning of a door handle (36) of the door latching mechanism (35). The door holding structure is arranged to swing under gravitational basis to a retracted position providing free passage through the door opening (12) when desired.

20 Claims, 4 Drawing Figures

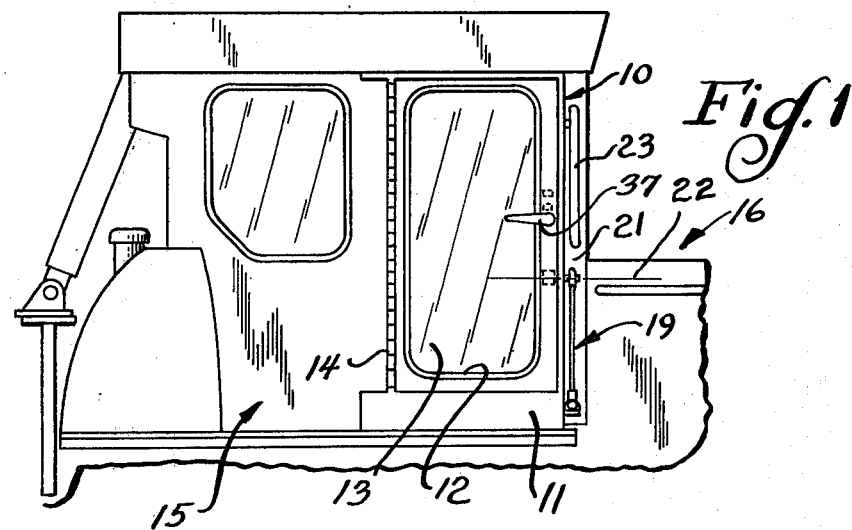
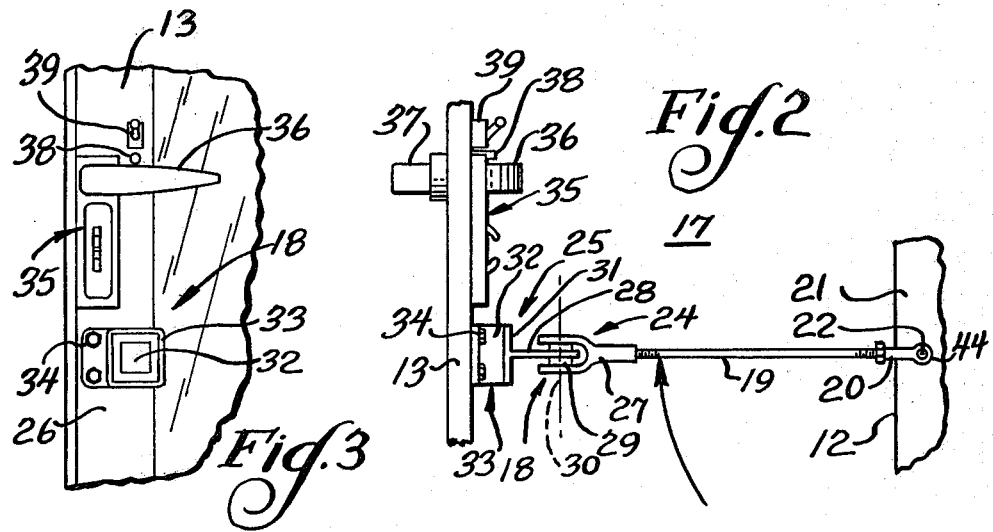
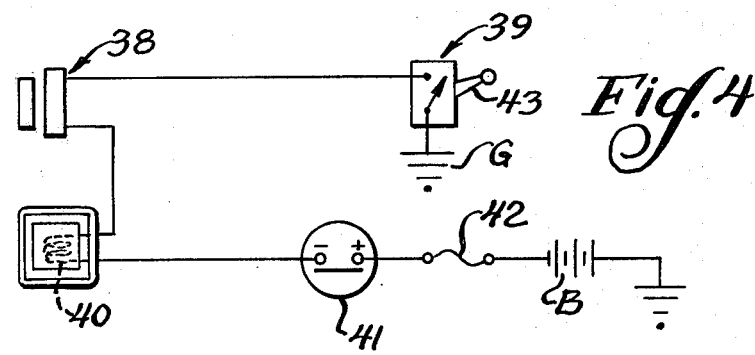

DOOR HOLDER

DESCRIPTION

TECHNICAL FIELD

This invention relates to door holders and in particular to door holders for use in vehicles and the like.

BACKGROUND ART

In a number of prior art applications, it has been found desirable to hold a door in an open position notwithstanding substantial forces acting on the door tending to swing it from the open position. One example of such an application is that of the door for a cab of a vehicle, such as an earthworking vehicle.

In the normal use of such earthworking vehicles, such as tractors, etc., the cab may be air conditioned. It has been found, however, that the operator may prefer to operate the vehicle with the air conditioning apparatus de-energized such as during temperate weather conditions. At such times, the operator may ventilate the cab by opening the cab door and various means have been provided for maintaining the door in the open position during such use.

One excellent example of a door holding means for such use is illustrated in U.S. Pat. No. 4,035,016 of John S. Ricca, which patent is owned by the assignee hereof. The apparatus for holding the door in the open position includes a crank having a handle and an eccentric arranged to hold the door against a stop. The structure includes a resilient linkage and means for limiting rotation of the crank to allow an over center action whereby the resilience of the linkage provides a firm holding of the door against the stop.

In another form of prior art structure for holding a door in an open position, catch mechanisms are provided at the top and bottom of the door. However, at times, relative motion occurs between the cab and the platform so as to cause twisting of the door held by the catches.

DISCLOSURE OF INVENTION

The present invention comprehends an improved means for holding a door in an apparatus, such as a vehicle, which is simple and economical of construction and which provides facilitated selective positioning thereof between retracted and door holding dispositions.

In one more specific aspect of the invention, the door holding means comprises a blocking element which is swingably mounted to the wall means defining the door opening so as to be selectively disposed across the opening to hold the door in the open position, or in a retracted position wherein the element hangs downwardly on the wall means.

In the illustrated embodiment, the elongated door blocking element comprises a rod which is pivotally mounted to the door frame by a pivot having a horizontal axis. The portion of the blocking element engaging the door defines a holding means at the opposite end of the blocking element.

The holding means may be pivotally connected to the blocking element so as to be pivotal about a vertical axis when the blocking element is disposed to hold the door open.

The invention further comprehends the provision of means spaced from the blocking element for releasing the holding means to permit the blocking element to return to the retracted position as by gravity.

The holding means may comprise magnetic means and in the illustrated embodiment, comprises electromagnetic means.

Energization of the electromagnetic means may be controlled by one or more switches. In the illustrated embodiment, one of the switches is arranged to be actuated as an incident of operation of the door handle.

A second of the illustrated door switches is arranged to be manually operated as desired.

In the specific illustrative embodiment, an electromagnet is mounted on the door and a magnetic plate is pivotally mounted to the distal end of the blocking element rod. The rod normally hangs downwardly with the magnetic plate lowermost. When the user wishes to hold the door in the open position, he need merely swing the rod to extend across the door opening so as to bring the plate into engagement with the electromagnet, whereupon energization of the electromagnet retains the blocking element suitably to maintain the door in the open position notwithstanding substantial forces being exerted thereon as in the operation of the vehicle in which the door structure is mounted.

In the illustrated embodiment, the switch, operable as an incident of operation of the door handle, is a proximity switch.

The door holding structure of the present invention, thusly, is extremely simple and economical of construction while yet providing a positive selective retention of the door in the open position when desired.

BRIEF DESCRIPTION OF THE DRAWINGS

FIG. 1 is a fragmentary side elevation of a vehicle having a cab provided with a door structure including means for selectively holding the door in an open position embodying the invention;

FIG. 2 is a fragmentary elevation illustrating the arrangement of the door holding means arranged to hold the door in the open position;

FIG. 3 is a fragmentary elevation of a portion of the door structure including a portion of the door holding means; and FIG. 4 is a schematic wiring diagram of the electrical circuit of the door holding means.

BEST MODE FOR CARRYING OUT THE INVENTION

In the exemplary embodiment of the invention ad disclosed in the drawing, a door structure generally designated 10 is shown to include wall means 11 defining an opening 12, and a door 13. A hinge 14 defines means for mounting the door for swinging movement between a closed position, as shown in FIG. 1 of the drawing, wherein the door extends across the opening 12, and an open position, as shown in FIG. 2 of the drawing, wherein the door is arranged to provide passage through the opening.

As illustrated in FIG. 1, door structure 10 is advantageously adapted for use in a cab generally designated 15 of a vehicle 16, such as an earthworking vehicle or the like. The cab defines an operator's space 17 wherein the operator of the vehicle normally is disposed for effecting operation thereof. As discussed above, at times, the operator of the vehicle may wish to open the door and hold it in the open position during operation of the vehicle. The present invention comprehends an improved door holding structure generally designated 18 for effecting such door retention.

More specifically, as illustrated in FIGS. 2 and 3, door holding structure 18 includes a blocking element 19 which may comprise an elongated rod having a mounting portion 20 at one end of the rod swingably mounted to a portion 21 of wall means 11 at the side of opening 12 opposite the disposition of hinge 14. In the illustrated embodiment, the mounting portion is pivotally mounted to swing the rod 19 about a horizontal axis 22 extending perpendicularly outwardly from the wall portion 21 so as to permit swinging of the rod 19 from a vertically downwardly extending retracted disposition, as illustrated in FIG. 1, and a horizontally extending blocking disposition, as shown in FIG. 2.

As the center of gravity of the blocking element is spaced from the pivot portion 20, the blocking element is normally biased to the downwardly extending disposition of FIG. 1 by gravitational biasing. As shown in FIG. 1, in the retracted disposition, blocking element 19 extends substantially directly downwardly below a grasping handle 23 fixedly mounted to the wall means 11.

In the door blocking disposition of FIG. 2, the blocking element effectively extends across the opening 12 to have the distal portion 24 thereof juxtaposed to the opened door remotely of hinge 14 to effectively block movement of the door from the open position. To maintain the blocking element in the door blocking position, a holding means generally designated 25 is provided on the blocking element end portion 24 and on the confronting portion 26 of door 13. More specifically, as illustrated in FIGS. 2 and 3, the holding means includes a clevis 27 defining the distal end of the blocking element, and a support 28 swingably mounted to the clevis by a pivot pin 29. As shown in FIG. 2, the axis 30 of pivot pin 29 extends vertically when the blocking element 19 is arranged in the door blocking position of FIG. 2, thus permitting the support 28 to swing about the vertical axis and suitably position a magnetic plate 31 to have facial engagement with a plate 32 of an electromagnetic device 33 carried by the door portion 26. As illustrated in FIGS. 2 and 3, the electromagnetic device 33 may be secured to the door portion 26 by suitable screws 34.

Door 13 is further provided with a latching mechanism generally designated 35 including an inner operating handle 36, as shown in FIGS. 2 and 3, and an outer operating handle 37, as shown in FIGS. 1 and 3.

Energization of the electromagnetic device 33 is controlled by a first switch 38 illustratively comprising a proximity switch disposed adjacent inner handle 36, as shown in FIG. 3, and a manually operable switch 39 mounted on door 13 adjacent switch 38. As illustrated in FIG. 4, coil 40 of the electromagnetic device 33 is connected in series with the proximity switch 38 and manually operable switch 39. The coil may be connected through an oil pressure switch 41 and a suitable protective fuse 42 to one side of the vehicle battery B, switch 39 being connected to the other side of the battery through a ground connection G. Thus, energization of coil 40 requires that the engine be running so as to provide positive oil pressure to close switch 41 and concurrent closing of switches 38 and 39. As discussed above, switch 38 may comprise a proximity switch and is disposed adjacent handle 36 so as to be closed as an incident of movement of the handle to the released disposition of FIG. 3. Switch 39 may include an operating handle 43 for selectively closing the single throw switch, as shown in FIG. 4, to complete the circuit for energizing coil 40.

Thus, it may be seen that when it is desired to de-energize the coil so as to release the door holding means, the user selectively may operate the manually operable switch 39 or may simply manipulate the door handle 36 so as to displace the door handle from the proximity switch 38 whereby the switches are selectively opened. Upon de-energization of the electromagnetic device coil 40, the blocking element is free to swing downwardly by its gravitational bias back to the retracted position of FIG. 1, thereby immediately permitting passage through the door opening 12 or closure of the door 13, as desired.

By mounting the pivot 22 on the door frame defined by wall means 11, the door holding means is effectively mounted to the same portion of the cab structure as that to which the hinge 14 is mounted, thereby effectively eliminating twisting strains on the hinge by the forces developed through the holding means.

The use of the electromagnetic magnetic holding means 25 permits the disposition of the control switch 39 as desired. While the control switch is illustratively shown as being disposed adjacent the door handle 36, as will be obvious to those skilled in the art, it may be suitably located elsewhere as desired, such as at the instrument console within the operator's station.

Thus, the improved, selectively blockable door structure of the present invention, as disclosed above, is extremely simple and economical of construction while yet providing an improved means for holding a door, such as the door of a vehicle cab in the open position while effectively preventing twisting stresses as developed by the prior art structures heretofore utilized for such door retention purposes.

INDUSTRIAL APPLICABILITY

The door structure of the present invention is advantageously adapted for a wide range of industrial uses while being advantageously adapted for use in vehicle cab door structures as discussed above. The door structure advantageously utilizes an electromagnetic device for improved control of the door holding function. Thus, the improved door structure is advantageously adapted for industrial applications wherein remote control of the release of the door holding means may be desired.

The door holding structure of the present invention is further advantageously adapted for use in industrial applications wherein it is desirable to cause an automatic retraction of the door holding mechanism away from the access opening controlled by the door upon release of the holding mechanism. Such an improved arrangement is advantageously adapted for use in the illustrated vehicle application wherein free ingress and egress through the door opening is highly desirable. At the same time, the retracted disposition of the door holding means in the illustrated embodiment is one wherein the holding mechanism is closely adjacent the door opening for facilitated manipulation by the user to the door blocking disposition when desired.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a door structure (10) having wall means (11) defining an opening (12), a door (13) provided with a locking handle (36), and means (14) for mounting the door (13) for swinging movement between a closed position extending across the opening and an open position, the improvement comprising:
   a blocking element (19) having a mounting portion (20) and a distal portion (24);
   means (44) swingably mounting said mounting portion to the wall means (11) adjacent said opening (12) for selective positioning in a second retracted position permitting free movement of the door (13) between said positions, and in a blocking position extending across said opening (12) with said distal portion (25) juxtaposed to the door (13) in the open position to prevent movement of the door (13) from the open position;
   electromagnetic means (25) for releasably holding the blocking element (19) in the blocking position; and
   control means for controlling said holding means (25) including a first switch (39) remote from the door and a second switch (38) adjacent the door, said control means including circuitry connecting said switches as an AND gate for releasing said holding means upon the opening of either switch and thereby permit the blocking element (19) to be returned to said retracted position.

2. In a door structure (10) having wall means (11) defining an opening (12), a door (13) and means (14) for mounting the door (13) for swinging movement between a closed position extending across the opening and an open position, the improvement comprising:
   a blocking element (19) having a mounting portion (20) and a distal portion (24);
   means (44) swingably mounting said mounting portion to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;
   holding means (25) for releasably holding the blocking element (19) in the blocking position; and
   means (36,38,39) spaced from said blocking element (19) for releasing said holding means (25) to permit said blocking element (19) to return to said retracted position, said holding means (25) comprising magnetic means (31,33).

3. The door structure (10) of claim 2 wherein said magnetic means (25) comprises electromagnetic means (31,33) and said means operable from remotely of said blocking element (19) comprises "switch" means (38,39) for de-energizing said electromagnetic means (31,33) and thereby releasing said magnetic means (25) to permit said blocking element (19) to return to said retracted position.

4. The door structure (10) of claim 1 wherein said mounting portion (20) is displaced from the center of gravity of said blocking element (19) whereby said blocking element (19) is biased by gravity to said retracted position.

5. The door structure (10) of claim 1 wherein said blocking element (19) comprises a rigid elongated element, said mounting portion (20) being disposed at one end of the element (19) whereby said blocking element (19) is biased by gravity to said retracted position.

6. The door structure (10) of claim 1 wherein said holding means (25) includes a holding member (28,31) pivotally mounted to said blocking element (19).

7. The door structure (10) of claim 1 wherein said second switch (38) is responsive to operation of the handle (36) for releasing said holding means (25).

8. In a vehicle (16) having wall means (11) defining an operator's station (17), an opening (12) for providing access to said operator's station (17), a door (13) provided with a locking handle (36), and means (14) for mounting the door (13) for swinging movement between a closed position extending across the opening (12) and an open position, the improvement comprising:
   a blocking element (19) having a mounting portion (20) and a distal portion (24);
   pivot means (44) swingably mounting said mounting portion (20) to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;
   electrically operable holding means (31,33) on said door (13) and blocking element (19) for releasably holding the blocking element (19) in the blocking position; and
   control means for controlling said holding means (31,33) including a first switch (39) remote from the door and a second switch (38) adjacent the door, said control means including circuitry connecting said switches as an AND gate for releasing said holding means upon the opening of either switch and thereby permit the blocking element (19) to be returned to said retracted position.

9. The vehicle door structure (10) of claim 8 wherein said blocking element (19) comprises a rod having said mounting portion (20) at one end and said distal portion (24) at the opposite end whereby said rod is gravity biased to said retracted position with said distal end lowermost.

10. In a vehicle (16) having wall means (11) defining an operator's station (17), an opening (12) for providing access to said operator's station (17), a door (13) and means (14) for mounting the door (13) for swinging movement between a closed position extending across the opening (12) and an open position, the improvement comprising:
    a blocking element (19) having a mounting portion (20) and a distal portion (24);
    pivot means (44) swingably mounting said mounting portion (20) to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;
    cooperating holding means (31,33) on said door (13) and blocking element (19) for releasably holding the blocking element (19) in the blocking position; and
    means (36,38,39) spaced from said blocking element (19) and within said operator's station (17) for releasing said holding means (31,33) to permit said blocking element (19) to return to said retracted position, said holding means comprising cooperating magnetic means (31,33) on said distal end (24) of the blocking element (19) and door (13).

11. The vehicle door structure (10) of claim 10 wherein further includes a latch mechanism (35) and a handle (36) for operating the latch mechanism (35), said holding means (25) including means responsive to operation of the handle (36) for releasing said holding means (25).

12. In a vehicle (16) having wall means (11) defining an operator's station (17), an opening (12) for providing access to said operator's station (17), a door (13) and means (14) for mounting the door (13) for swinging movement between a closed position extending across the opening (12) and an open position, the improvement comprising:
 a blocking element (19) having a mounting portion (20) and a distal portion (24);
 pivot means (44) swingably mounting said mounting portion (20) to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;
 cooperating holding means (31,33) on said door (13) and blocking element (19) for releasably holding the blocking element (19) in the blocking position; and
 means (36,38,39) spaced from said blocking element (19) and within said operator's station (17) for releasing said holding means (31,33) to permit said blocking element (19) to return to said retracted position, said holding means comprising cooperating electromagnetic means (31,33) on said distal end (24) of the blocking element (19) and door (13), said door (13) further including a latch mechanism (35) and a handle (36) for operating the latch mechanism (35), said holding means including switch means (38) responsive to operation of the handle (36) for de-energizing the electromagnetic means and thereby releasing said holding means.

13. In a vehicle (16) having wall means (11) defining an operator's station (17), an opening (12) for providing access to said operator's station (17), a door (13) and means (14) for mounting the door (13) for swinging movement between a closed position extending across the opening (12) and an open position, the improvement comprising:
 a blocking element (19) having a mounting portion (20) and a distal portion (24);
 pivot means (44) swingably mounting said mounting portion (20) to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;
 cooperating holding means (31,33) on said door (13) and blocking element (19) for releasably holding the blocking element (19) in the blocking position; and
 means (36,38,39) spaced from said blocking element (19) and within said operator's station (17) for releasing said holding means (31,33) to permit said blocking element (19) to return to said retracted position, said holding means comprising cooperating electromagnetic means (31,33) on said distal end (24) of the blocking element (19) and door (13), said door (13) further including a latch mechanism (35) and a handle (36) for operating the latch mechanism (35), said holding means including proximity switch means (38) responsive to operation of the handle (36) for de-energizing the electromagnetic means and thereby releasing said holding means.

14. The vehicle door structure (10) of claim 8 wherein said pivot means (44) defines a horizontal pivot axis (22), and said holding means includes a holding member (31) mounted to said distal portion (24) of the blocking element (19) to pivot about a vertical axis 30 when the blocking element (19) is in the blocking position.

15. In a vehicle (16) having wall means (11) defining an operator's station (17), an opening (12) for providing access to said operator's station (17), a door (13) and means (14) for mounting the door (13) for swinging movement between a closed position extending across the opening (12) and an open position, the improvement comprising:
 a blocking element (19) having a mounting portion (20) and a distal portion (24);
 pivot means (44) swingably mounting said mounting portion (20) to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;
 cooperating holding means (31,33) on said door (13) and blocking element (19) for releasably holding the blocking element (19) in the blocking position; and
 means (36,38,39) spaced from said blocking element (19) and within said operator's station (17) for releasing said holding means (31,33) to permit said blocking element (19) to return to said retracted position, said holding means comprising cooperating electromagnetic means (31,33) on said distal end (24) of the blocking element (19) and door (13), said door (13) further including a latch mechanism (35) and a handle (36) for operating the latch mechanism (35), said holding means including switch means (38) responsive to operation of the handle (36) for de-energizing the electromagnetic means and thereby releasing said holding means, said electromagnetic means (31,33) comprising an electromagnet (33) on said door (13) and a magnetizable element (31) on said distal end (24) of the blocking element (19).

16. The door structure of claim 8 wherein said second switch is operable as an incident of manipulation of said handle (36).

17. In a door structure (10) having wall means (11) defining an opening (12), a door (13) having a latch mechanism (35) provided with an operating handle (36) and means (14) for mounting the door (13) for swinging movement between a closed position extending across the opening (12) and an open position, the improvement comprising:

a blocking element (19) having a mounting portion (20) and a distal portion (24);

means (44) swingably mounting said mounting portion (20) to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;

holding means (25) for releasably holding the blocking element (19) in the blocking position; and means (36,38,39) operable as an incident of manipulation of said handle (36) for releasing said holding means (25) to permit said blocking element (19) to return to said retracted position, said holding means (25) comprising electromagnetic means (31) and said means operable as an incident of manipulation of said handle (36) comprising switch means (38) for controlling energization of the electromagnetic means (31).

18. The door structure (10) of claim 17 wherein said door structure (10) further includes a second switch means (39) manually operable independently of operation of the door handle (36) for controlling energization of said electromagnetic means (31).

19. The door structure (10) of claim 17 wherein said door structure (10) further includes a second switch means (39) carried on the door (13) and being manually operable independently of operation of the door handle (36) for controlling energization of said electromagnetic means (31).

20. In a door structure (10) having wall means (11) defining an opening (12), a door (13) having a latch mechanism (35) provided with an operating handle (36) and means (14) for mounting the door (13) for swinging movement between a closed position extending across the opening (12) and an open position, the improvement comprising:

a blocking element (19) having a mounting portion (20) and a distal portion (24);

means (44) swingably mounting said mounting portion (20) to the wall means (11) adjacent said opening (12) for selective positioning in a second retracted position permitting free movement of the door (13) between said positions, and in a blocking position extending across said opening (12) with said distal portion (24) juxtaposed to the door (13) in the open position to prevent movement of the door (13) from the open position;

holding means (25) for releasably holding the blocking element (19) in the blocking position; and means (36,38,39) operable as an incident of manipulation of said handle (36) for releasing said holding means (25) to permit said blocking element (19) to return to said retracted position, said holding means (25) comprising electromagnetic means (31) and said means operable as an incident of manipulation of said handle (36) comprising proximity switch means (38) for controlling energization of the electromagnetic means (31).

* * * * *